Jan. 18, 1955  E. E. SHELDON  2,700,116
DEVICE FOR INTENSIFICATION OF X-RAY IMAGES
Filed Feb. 11, 1950

INVENTOR.
EDWARD E. SHELDON
BY
ATTORNEY

United States Patent Office 2,700,116
Patented Jan. 18, 1955

2,700,116

DEVICE FOR INTENSIFICATION OF X-RAY IMAGES

Edward E. Sheldon, New York, N. Y.

Application February 11, 1950, Serial No. 143,745

8 Claims. (Cl. 313—65)

This invention relates to an improved method and device of intensifying images and refers more particularly to an improved method and device for intensifying images formed by an invisible radiation which term is meant to include X-rays and other invisible radiations, such as gamma rays and the like, and also irradiation by beams of atom particles such as e. g. neutrons. This invention is a continuation in part of my Patent No. 2,555,424 issued June 5, 1951, on application Serial No. 13,916 filed on March 9, 1948.

One primary object of this invention is to provide a method and device to produce intensified images. This intensification will enable to overcome the inefficiency of the present X-ray fluoroscopic examinations. At the present level of illumination of the fluoroscopic image, the human eye has to rely exclusively on scotopic (dark adaptation) vision, which is characterized by a tremendous loss of normal visual acuity in reference both to detail and to the contrast.

Another object of this invention is to make it possible to prolong the fluoroscopic examination since it will reduce markedly the strength of radiation affecting the patient's body. Conversely, the exposure time or energy necessary for the radiography may be reduced.

Another object is to provide a method and device to produce sharper X-ray fluoroscopic and radiographic images than was possible until now.

Another important object of this invention is to provide a method and device to amplify the contrast of the X-ray image.

The present intensifying devices concerned with reproduction of X-ray fluoroscopic images were completely unsatisfactory, as in the best of them, amplification of the original image brightness of the order of 3 to 5 was achieved, while in order to obtain improvement in the visual acuity intensification of the brightness of the order of 500–1000 is obligatory. Without intensification of luminosity of at least of the order of 500–1000 the eye is confined to so-called scotopic vision at which it is not able to perceive definition and contrast of the fluoroscopic image. It is well known that intensification of the brightness of the X-ray fluoroscopic image cannot be achieved by increase of energy of the X-ray radiation as it will result in damage to the patient's tissues. Therefore to obtain the objects of this invention a special X-ray sensitive pick-up tube had to be designed. This novel X-ray pick-up tube is characterized by elimination of the optical system which resulted in 20–30 fold gain in the light reaching the photocathode. This gain of incident light on photocathode allowed to activate the television system, which before was not possible as with the amount of incident light available after passage through the focusing optical system the signal to noise ratio was too low for satisfactory results.

To accomplish the objectives of this invention, a composite X-ray sensitive screen consisting of an extremely thin photoemissive layer and of X-ray fluorescent or reactive layer, is positioned within a novel X-ray pick-up tube to function as a receiving photocathode for the invisible X-ray image. This combination represents a basic improvement, as it results in 20–30 fold gain in light reaching the photoemissive layer. The importance of this construction is clear when it is considered that the most sensitive television pick-up tubes have a threshold of operation at above 0.01 millilambert at which level the sharpness of produced image is unsatisfactory. It is obvious therefore, that the elimination of the optical system disposed between the fluorescent screen and television pick-up tube represents an important improvement in securing the necessary amount of light for operation of the tube. Still better results were obtained by the use of a very thin light reflecting layer, such as for example, of aluminum deposited on the surface of the fluorescent layer of the composite screen, nearest the source of radiation in order to increase the transfer of light to the photoemissive layer. In some cases, it is very important to interpose between the fluorescent and photoemissive layers a very thin light transparent, chemically inactive separating layer.

The signal to noise ratio controlling the sharpness and contrast of the image was further improved by the use of series of composite screens, each consisting of electron transparent light reflecting layer, electron fluorescent layer, chemically inactive light transparent layer and of photoemissive layer, which screens are disposed in the novel X-ray pick-up tube in succeeding stages. The X-ray image is converted in the composite X-ray sensitive photocathode into photoelectron image. The photoelectron image is accelerated and focused by the electrical or magnetic field, on the next electron sensitive composite screen, whereby an intensified photoelectron image is produced, which again may be focused on the next electron sensitive composite screen, producing further intensification of image.

Further intensification of the X-ray image was obtained by the use of one or plural electron multipliers disposed between the composite X-ray sensitive photocathode described above and the target of the X-ray sensitive pickup tube. The photoelectron image having the pattern of the X-ray image emitted by the composite X-ray sensitive photocathode is accelerated and focused by the electric or magnetic fields on the secondary electron-emissive electrode, whereby an intensified electron image is produced.

In some instances it is advantageous to demagnify the electron image emitted by the first composite X-ray sensitive screen before projecting it on the next composite screen or on the electron multiplier electrode. The electron diminution of the image results in its intensification proportional to the linear decrease of its size. Next the intensified photoelectron image is stored in the target of the X-ray sensitive pick-up tube, for a predetermined period of time, then is scanned by electron beam and converted into video signals. Video signals are sent to amplifiers. By the use of variable mu amplifiers in one or two stages intensification of video signals can be produced in non-linear manner, so that small differences in intensity of succeeding video signals can be increased one to ten times, producing thereby a corresponding gain of the contrast of the final visible image in receivers, which was one of the objectives of this invention.

The invention will appear more clearly from the following detailed description when taken in connection with the accompanying drawings by way of example only preferred embodiments of the inventive idea.

Figure 1:
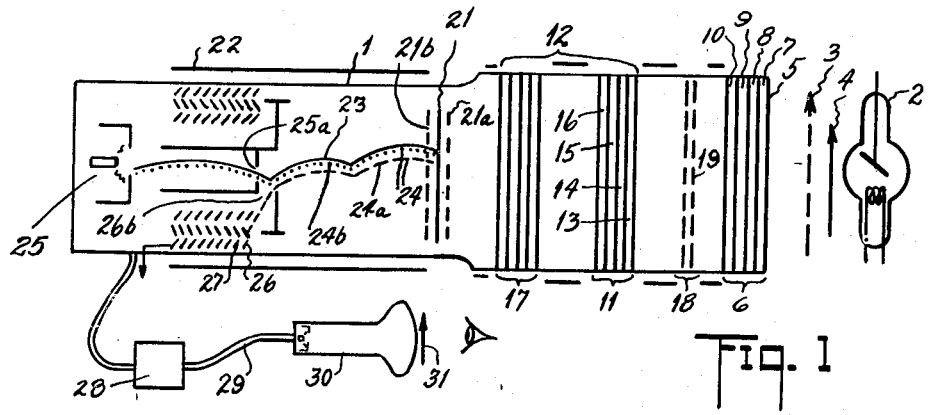
Figure 1 is a cross-sectional view of the X-ray image intensifying system showing the X-ray sensitive pick-up tube.

Reference now will be made to Fig. 1 which illustrates new X-ray sensitive pick-up tube 1 to accomplish the purposes of the invention as outlined above. The X-ray source 2 produces invisible X-ray image 3 of the examined body 4. The invisible X-ray image 3 penetrates through the face 5 of the X-ray sensitive pick-up tube and activates the composite screen 6 acting as a photocathode and which consists of a very thin X-ray transparent light reflecting and therefore light opaque layer 7 such as e. g. of aluminum, of X-ray fluorescent layer 8 of a very thin chemically inactive light transparent separating layer 9 and of photoemissive layer 10. The face 5 of the tube is of material transparent to radiation used for examination.

The fluorescent layer 8 and the photoemissive layer 10 should be correlated so that under the influence of the particular radiation used there is obtained a maximum photoemissive effect. More particularly the fluorescent layer should be of a material having its greatest sensitivity to the type of radiation to be used and the photoemissive material likewise should have its maximum sensitivity to the wave length emitted by the fluorescent layer. Fluorescent substances that may be used are: zinc silicates, zinc selenides, zinc sulphide, calcium tungstate or $BaPbSO_4$ with or without activators. Activators also depend on the type of radiation to be used. For short wave radiation Ag and Cd are very efficient. For long wave radiation Ce or Sa are best activators with selenides and Pb or Cu with sulphides. The satisfactory photoemissive material will be caesium oxide, activated by silver, or caesium, potassium or lithium with antimony or bismuth. An extremely thin light transparent chemically inactive separating layer 9 should separate the fluorescent (8) and photoemissive (10) layers. The separating layer 9 can be exceedingly thin light transparent film of mica, glass, silica, $ZnF_2$ or of a suitable plastic. Silica is transparent to ultra-violet radiation. $ZnF_2$ is electrically conductive. The X-ray image 3 is converted in the fluorescent layer 8 of the composite photocathode 6 into a fluorescent image and then in the photoemissive layer 10 into a photoelectron image. The photoelectron image having the pattern of the X-ray image is accelerated by electric fields and is focused by means of magnetic or electrostatic fields on the first composite screen 11 of the image amplifying section 12 of the tube. The amplifying section 12 has one or a few successively arranged composite screens 11 each of them consisting of electron pervious, light reflecting layer 13, of layer 14 fluorescing when irradiated by electrons, of a very thin chemically inactive separating layer 15 transparent to fluorescent light and of photoemissive layer 16. Fluorescent substances which may be used for the composite screen are zinc silicates, zinc selenides, zinc sulphide, calcium tungstate or $BaPbSO_4$, with or without additional activators. The satisfactory photoemissive materials are caesium oxide activated by silver, caesium with antimony or with bismuth or antimony with lithium or potassium. The separating layer 15 between the fluorescent and photoemissive surfaces can be a very thin light transparent layer of mica, glass, $ZnF_2$, of silica or of a suitable plastic. The electron pervious light reflecting layer 13 may be of aluminum or of silver. The photoelectron image from the photocathode 6 focused on the composite screen 11 causes fluorescence of its fluorescent layer 14 which activates the photoemissive layer 16 producing an intensified photoelectron image having the pattern of the X-ray image. The intensified photoelectron image can be again focused on next composite screen 17 having the same construction as the above described screen 11, whereby its further intensification is achieved.

In some instances, it is advantageous to demagnify the photoelectron image emitted by the composite photocathode 6 before projecting it on the composite screen 11 of the amplifying section 12. The electron diminution of the image is accomplished by means of electrostatic or magnetic fields which are well known in the art and therefore are omitted in order not to complicate drawings.

In some applications it may be preferable to use in conjunction with amplifying section 12 the electron multiplier section 18 consisting of one or few stages of secondary electron emitters 19 which serves to intensify further the electron image. In such a case the electron image from the composite photocathode is focused by means of electrostatic or magnetic fields on the first stage 19 of the multiplier section. This results in intensification of the electron image by secondary emission. The secondary electrons emitted from the first stage and having the pattern of the X-ray image may be focused after acceleration on the second stage of the multiplier section, producing thereby further intensification of the electron image. The electron image produced by electron multiplier section of the tube is projected on the first composite screen 11 of the amplifying section 12 of the pick-up tube for further intensification. The electron image produced by the amplifying section of the tube is focused on the two-sided target 21 producing therein pattern of electrical charges corresponding to the X-ray image.

The target is a semi-conductive screen such as of glass. The target is provided on the side facing the X-ray image with a fine mesh screen 21a which is closely spaced to it. The electron image can be stored in the target for a predetermined time by choosing proper resistivity and conductivity of target material. The target 21 is scanned by electron beam 23 from the electron gun 25. The scanning electron beam is given helical motion by placing the beam aperture 25a at an antinode in the beam and slightly off the axis of the tube. The scanning electron beam is modulated by the pattern of electrical charges on the target. The returning electron beam 24 consists of two different groups of electrons. One of them (24b) represents electrons specularly reflected by the target 21, whereas the other group (24a) is formed by non-specularly reflected, that is, scattered electrons. The two groups may be separated from each other by means of the multiplier aperture 26b which admits only the non-specularly reflected fraction 24a of the returning beam. Video signals in this construction are provided only by the fraction 24a of the returning beam which is admitted into the multiplier 26 through the multiplier aperture 26b. The strongest video signals will correspond to the highlights of the picture because the strongest non-specular reflection of electrons takes place at the most positively charged areas of the target 21. The admitted fraction of the returning electron beam strikes the first stage of the electron multiplier 26. The secondary electrons from the first stage of the multiplier strike the succeeding stage 27 which is around and in the back of the first stage. This process is repeated in a few stages resulting in a marked multiplication of the original electron signals. The signal currents from the last stage of the multiplier are fed into television amplifiers 28 and then sent by coaxial cable 29 or by high frequency waves to the receivers of kinescope type 30 or facsimile type in which they are reconverted into visible image 31 for inspection or for recording.

In front of the target 21 there is positioned a screen 21b which is of a very fine mesh and being placed in out-of-focus position does not impair the detail of the image. This screen 21b serves to produce a strong electric field in front of the target necessary to reduce the residual scan of the returned beam. To accomplish this objective, other means may be also used but the mesh screen is preferable. In order to obtain amplification of contrast of the X-ray image, the amplifiers 28 are provided with variable tubes in one or two stages. Small differences in intensity of the succeeding video signals are increased by variable mu tubes in non-linear manner resulting in a gain of the contrast of the visible image in receivers. The focusing, synchronizing and deflecting circuits 22 are not shown in detail as they are well known in the art and would complicate the drawings.

Figure 2:
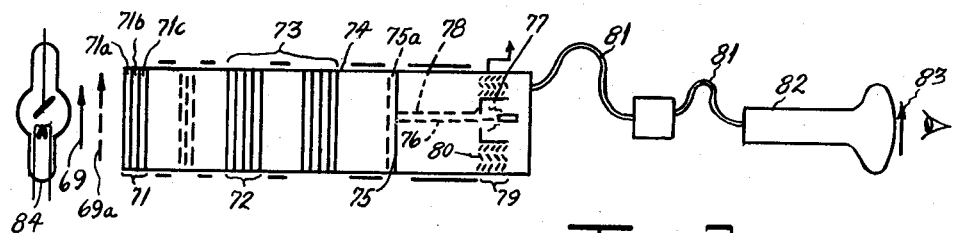
Figure 2 is a sectional view showing an alternate form of the X-ray sensitive pick-up tube.
Figure 3:
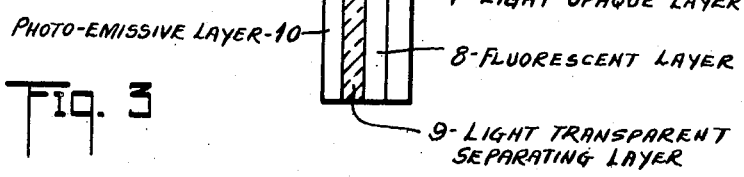
Figure 3 shows the composite photocathode.
Figure 4:
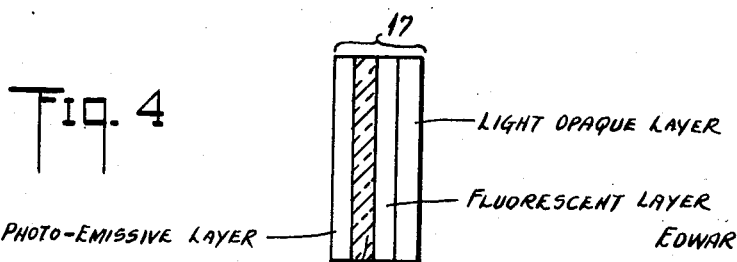
Figure 4 shows the composite screen.

Another variety of this invention is shown in Fig. 2. In this construction the X-ray image 69a of the examined body 69 is projected onto X-ray image sensitive pick-up tube 74. The composite photocathode 71 of said tube consists of a fluorescent layer 71a, a very thin light transparent separating layer 71b, and of a photoemissive layer 71c, and converts the X-ray image into a photoelectron image. The photoelectron image from the photocathode is projected on the first composite screen 72 of amplifying section 73 of the X-ray pick-up tube for further intensification. The electron image formed by the amplifying section of the pick-up tube is now focused by means of magnetic or electro-magnetic fields on the two-sided target 75, producing therein a pattern of electric charges corresponding to the X-ray image. The target 75 is provided with a fine mesh screen 75a on the side facing the X-ray source 84. The electron image can be stored in the target for a predetermined time by choosing proper resistivity and conductivity of target material. The target 75 is scanned by electron beam 76 from the electron gun 77. The scanning electron beam is modulated by the pattern of electrical charges of the target so that the returning beam 78 carries video information. In particular the highlights of the picture will produce strong positive areas in the target and will cause therefore strong neutralization of the scanning electron beam. The returning electron beam corresponding to such areas will be obviously weak, which is opposite to the operation of the X-ray pick-up tube 1 described above. The returning electron beam strikes the first stage of the electron multiplier 79. The secondary electrons from the first stage 80 of the multiplier strike the succeeding stage around and in the back of the first stage. This process is repeated in a few stages resulting in a marked multiplication of the original electron signals. The signal currents from the last stage of the multiplier are fed into television amplifiers and then sent by coaxial cable 81 or by high frequency waves to the receivers of kinescope type 82 or facsimile type in which they are reconverted into visible images 83 for inspection or for recording.

Although particular embodiments and forms of this invention have been illustrated, it is understood that modifications may be made by those skilled in the art without departing from the true scope and spirit of the foregoing disclosure.

Having thus described my invention what I claim as new and desire to secure by Letters Patent of the United States is:

1. A vacuum tube having a composite screen comprising fluorescent means for receiving a beam of X-ray radiation and converting said radiation beam into a fluorescent light, separating means transparent to said fluorescent light and having the property of electrical conductivity, photoelectric means adjacent to said separating means receiving said fluorescent light through said transparent separating means and emitting in response to said fluorescent light a beam of electrons and means for converting said emitted electrons into video signals.

2. A vacuum tube containing within said tube in combination a composite screen comprising light reflecting means, fluorescent means for receiving a beam of X-ray radiation through said light reflecting means and converting said radiation beam into a fluorescent light, separating means transparent to said fluorescent light and having the property of electrical conductivity, photoelectric means receiving said fluorescent light through said transparent separating means and emitting in response to said fluorescent light a beam of electrons, and means for converting said emitted electrons into video signals.

3. A vacuum tube containing within said tube in combination a composite screen comprising fluorescent means for receiving a beam of X-ray radiation and converting said radiation beam into a fluorescent light, separating means transparent to said fluorescent light and having the property of electrical conductivity, photoelectric means in contact with said separating means and receiving said fluorescent light through said separating means and emitting electrons in response to said light, and a screen for receiving said emitted electrons.

4. A vacuum tube having a composite screen comprising light reflecting means, fluorescent means for receiving a beam of X-ray radiation through said light reflecting means and converting said radiation beam into a fluorescent light, separating means transparent to said fluorescent light and having the property of electrical conductivity, photoelectric means in contact with said separating means and receiving said fluorescent light through said separating means and emitting electrons in response to said fluorescent light, and a screen for receiving said emitted electrons.

5. A vacuum tube having in combination a composite screen comprising fluorescent means for converting a beam of X-ray radiation into a fluorescent light, separating means transparent to said fluorescent light and also transparent to ultra-violet radiation and photoelectric means in contact with said transparent separating means for receiving said fluorescent light through said transparent separating means and converting said fluorescent light into a photoelectric image, a source of a scanning electron beam and means for converting said photoelectric image into video signals.

6. A vacuum tube containing within said tube in combination a composite screen comprising light opaque means, fluorescent means for receiving a beam of X-ray radiation through said light opaque means and for converting said beam of radiation into a fluorescent image, separating means transparent to said fluorescent light and also transparent to ultra-violet radiation and photoelectric means in contact with said transparent means for receiving said fluorescent light through said transparent separating means and converting said fluorescent light into a photoelectric image, a source of scanning electron beam and means for converting said photoelectric image into video signals.

7. A vacuum tube having in combination a composite screen comprising fluorescent means for converting a beam of X-ray radiation into a fluorescent light, separating means transparent to said fluorescent light and also transparent to ultra-violet radiation and photoelectric means having a continuous surface for receiving said fluorescent light through said transparent separating means and emitting electrons in response to said fluorescent light, and a screen for receiving said emitted electrons.

8. A vacuum tube containing within said tube in combination a composite screen comprising light reflecting means, fluorescent means for receiving a beam of X-ray radiation through said light reflecting means and converting said radiation beam into a fluorescent light, separating means transparent to said fluorescent light and also transparent to ultra-violet radiation and photoelectric means having a continuous surface for receiving said fluorescent light through said transparent separating means and emitting electrons in response to said fluorescent light, and a screen for receiving said emitted electrons.

References Cited in the file of this patent

UNITED STATES PATENTS

| Number | Name | Date |
|---|---|---|
| 2,158,853 | Coolidge | May 16, 1939 |
| 2,219,113 | Ploke | Oct. 22, 1940 |
| 2,234,806 | Ploke | Mar. 11, 1941 |
| 2,248,977 | Flory et al. | July 15, 1941 |
| 2,297,478 | Kallman | Sept. 29, 1942 |
| 2,319,712 | Williams | May 18, 1943 |
| 2,442,287 | Edwards | May 25, 1948 |
| 2,452,619 | Weimer | Nov. 2, 1948 |
| 2,477,307 | Mackta | July 26, 1949 |
| 2,481,458 | Wertz | Sept. 6, 1949 |
| 2,525,832 | Sheldon | Oct. 17, 1950 |
| 2,545,982 | Weimer | Mar. 20, 1951 |
| 2,555,423 | Sheldon | June 5, 1951 |
| 2,555,424 | Sheldon | June 5, 1951 |
| 2,579,351 | Weimer | Dec. 18, 1951 |
| 2,690,516 | Sheldon | Sept. 28, 1954 |